W. J. HANPETER.
ADJUSTABLE CASTER.
APPLICATION FILED APR. 29, 1911.

1,000,731.

Patented Aug. 15, 1911.

Witnesses:
Harry H. Reiss.
George G. Anderson.

Inventor:
Waldemar J. Hanpeter,
By Hugh K. Wagner
His Attorney.

UNITED STATES PATENT OFFICE.

WALDEMAR J. HANPETER, OF ST. LOUIS, MISSOURI.

ADJUSTABLE CASTER.

1,000,731. Specification of Letters Patent. Patented Aug. 15, 1911.

Application filed April 29, 1911. Serial No. 624,035.

*To all whom it may concern:*

Be it known that I, WALDEMAR J. HANPETER, a citizen of the United States, residing at the city of St. Louis, State of Missouri, have invented certain new and useful Improvements in Adjustable Casters, of which the following is a specification.

This invention relates to certain new and useful improvements in casters and the object of the invention is to provide an effective device of this character by means of which the lengths of furniture legs may be adjusted to compensate for any discrepancy either in the lengths of the legs or in any unevenness in the floor.

Further the invention aims to provide a device of this type in which the adjustment may be effected without disturbing the position of the caster roller.

Further and other objects will later appear.

Figure 1:
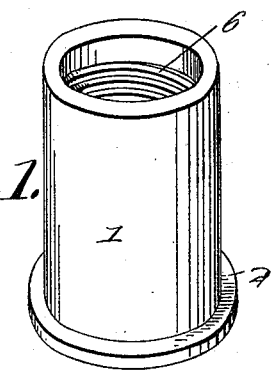
Figure 2:
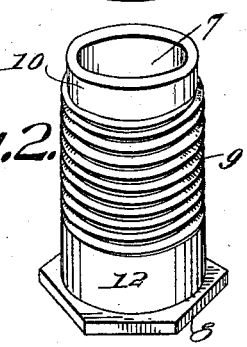
Figure 4:
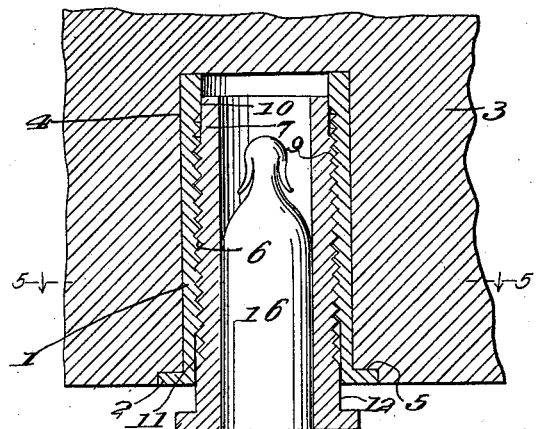
Figure 3:
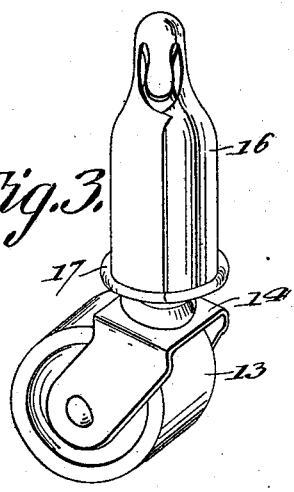
Figure 5:
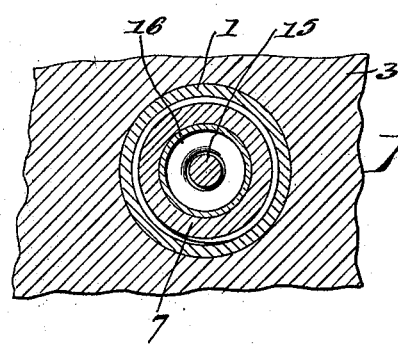

In the drawings: Figure 1 is a perspective view of the socket member of the device, Fig. 2 is a similar view of the caster carrying member, Fig. 3 is a similar view of the caster proper, Fig. 4 is a vertical sectional view showing the parts in use, and Fig. 5 is a section on the line 5—5 of Fig. 4.

1 designates the socket member which is provided at its lower end with an outwardly extending right angular circular flange 2.

3 designates a leg of a piece of furniture which is provided with a hole 4 countersunk at its base to form an opening 5 in which the flange 2 seats. The socket 1 is provided with a series of interior threads 6 which latter terminate at points spaced from the ends of the socket 1. The caster carrying member is composed of a sleeve 7 which is formed at its lower end with an outwardly extending right angular hexagonal head 8.

9 designates a series of threads formed on the exterior of the caster carrying member which threads terminate at points above the head 8 and below the top end of the caster carrying member, in order to form an unthreaded end 10 which latter is of substantially the same diameter as that of the threaded portion of socket 1, in order that when the parts are being initially united the unthreaded end 10 will engage with the threads 6 and serve to guide the threads 9 of the caster carrying member into engagement with the threads 6 of socket 1. The base end of the socket 1 on the interior of the same is unthreaded as indicated at 11 and is of greater diameter than that of the plain end 10 of the caster carrying member, to permit said end 10 to be readily introduced into the socket 1. By this construction of the parts it will be seen that the plain end 10 of the caster carrying member can quickly and easily be inserted into the socket 1 whereby the parts can be threaded into engagement by a mere turning movement of the same. Moreover by providing the threads 6 and 9 so that they extend but a portion of the lengths of the socket 1 and the caster carrying member respectively, it will be seen that any adjustment of the parts can be effected with the expenditure of less force than were the threads to extend throughout the lengths of said parts. The caster carrying member at its base has an exterior plain face 12 which engages with the enlarged unthreaded lower end 11 of the socket 1 when the parts are in the position depicted in Fig. 4 of the drawings.

In Fig. 3 of the drawings is shown the caster proper which is used in connection with the present invention, the latter consisting of a roller 13 mounted on a frame 14, the latter having pintle 15 secured thereto, which pintle is carried for free rotation in a shank 16, the shank being compressible and self-holding, that is to say the shank proper is constructed of spring metal which, when the shank is forced into the socket of the caster carrying member 7, binds against the walls which define said socket, and thereby acts to hold the caster shank in the socket by frictional contact alone. Moreover, by use of a caster of this type the roller is permitted to run in any direction, and when the parts are being adjusted, the roller will remain stationary, while the caster carrying member 7, together with the shank 16 of the caster proper, may be rotated to effect the desired raising or lowering of the member 7 with respect to the socket 1. The base of the shank 16 is provided with an annular flange 17 which abuts against the under face of the head 8 of member 7, thereby restricting the inward movement of the caster shank with respect to the socket 1.

By use of the present invention in adjusting the parts there is no possibility of the carpet or floor being in any way affected by such adjustment, since the roller of the caster remains stationary and no tearing of the carpet or jamming of the roller or marring of the floor is possible.

I claim:

1. In combination with a caster including a roller and a shank rotatable with respect thereto, said shank being compressible, a hollow sleeve-like member receiving said caster shank on its interior, said caster shank being secured to said sleeve-like member by frictional contact therewith, said sleeve-like member having its exterior threaded, the threaded portion extending between points spaced from the ends of said sleeve-like member, the upper end of the sleeve-like member being of reduced diameter as compared with the lower unthreaded end thereof, and a socket having an interiorly threaded portion, the threads of said socket extending between points spaced from the ends of the socket, the unthreaded lower end portion of the socket interior being enlarged as compared with the unthreaded upper portion thereof.

2. In combination with a threaded socket, and a member threaded into engagement therewith, and a caster including a shank rigidly secured to said member and having a pintle rotatable with respect to the shank and extending up into the same, said shank being secured to said member by frictional contact, and being formed so as to be compressible.

In testimony whereof I hereunto affix my signature in the presence of two witnesses.

WALDEMAR J. HANPETER.

Witnesses:
GEORGE G. ANDERSON,
GLADYS WALTON.

---

Copies of this patent may be obtained for five cents each, by addressing the "Commissioner of Patents, Washington, D. C."